United States Patent
Frederick et al.

(10) Patent No.: US 12,242,288 B1
(45) Date of Patent: Mar. 4, 2025

(54) AUTONOMOUS DRONE MESH SENSOR DEPLOYMENT SYSTEM

(71) Applicant: Uniform Sierra Aerospace, LLC, West Lafayette, IN (US)

(72) Inventors: Jeremy Frederick, West Lafayette, IN (US); Nick Hansen, West Lafayette, IN (US); Duncan Mulgrew, West Lafayette, IN (US)

(73) Assignee: Uniform Sierra Aerospace, LLC, West Lafayette, IN (US)

( * ) Notice: Subject to any disclaimer, the term of this patent is extended or adjusted under 35 U.S.C. 154(b) by 0 days.

(21) Appl. No.: 18/677,146

(22) Filed: May 29, 2024

(51) Int. Cl.
| | |
|---|---|
| B25J 9/16 | (2006.01) |
| B64D 1/08 | (2006.01) |
| G05D 1/222 | (2024.01) |
| G05D 1/243 | (2024.01) |
| G05D 1/247 | (2024.01) |
| G05D 1/656 | (2024.01) |
| H04L 67/12 | (2022.01) |
| G05D 105/40 | (2024.01) |
| G05D 109/20 | (2024.01) |

(52) U.S. Cl.
CPC ............... *G05D 1/665* (2024.01); *B64D 1/08* (2013.01); *G05D 1/222* (2024.01); *G05D 1/243* (2024.01); *G05D 1/247* (2024.01); *H04L 67/12* (2013.01); *G05D 2105/40* (2024.01); *G05D 2109/20* (2024.01)

(58) Field of Classification Search
CPC .................................. B64D 1/08; H04L 67/12
See application file for complete search history.

(56) References Cited

U.S. PATENT DOCUMENTS

| | | | |
|---|---|---|---|
| 2013/0240749 A1* | 9/2013 | Imholt | ................... G01V 5/281 |
| | | | 250/391 |
| 2017/0246742 A1* | 8/2017 | Baroudi | ................. B25J 9/1664 |

* cited by examiner

*Primary Examiner* — Hongmin Fan
(74) *Attorney, Agent, or Firm* — Cognition IP, P.C.; Edward Steakley; Schiller Hill

(57) ABSTRACT

Systems, tools and methods for deploying a mesh sensor network. The system comprises one or more aircraft configured to carry one or more drop pods into an environment and the deploying of the drop pods at points of interest. The aircraft and drop pods may comprise arrays of sensors for monitoring the areas that they are operating in. The aircraft and drop pods may include mesh radio communication devices and operate as nodes in the mesh network. The location at which each drop pod is to be deployed may be determined based on the type of sensors carried by the drop pod.

16 Claims, 13 Drawing Sheets

AUTONOMOUS DRONE MESH SENSOR DEPLOYMENT SYSTEM

FIELD

The present invention relates generally to systems, tools and methods to deploy and wirelessly communicate with sensors within an environment.

BACKGROUND

Poor communication and coordination of assets in hazardous environments can be costly and dangerous for everyone involved. Fires and natural disasters require responders to risk their lives in the search for survivors. The danger is increased due to the lack of reliable communication and environmental data. The present invention resolves these shortcomings.

SUMMARY

The system and methods described herein provide for the deployment of a mesh sensor network. The mesh sensor deployment system may comprise a mesh network further comprising a ground control station (GCS), an aircraft and one or more drop pods. The GCS may comprise a GCS control module, a slave mesh radio module, a command UI module, and one or more display units. The drop pods may comprise a drop pod control module, a pod mesh radio module, and a pod sensor array module. The pod sensor array module may comprise one or more sensor types. Each of the drop pods may have a pod type that corresponds to the sensor types. The aircraft may comprise a flight control module, a master mesh radio module, an aircraft sensor array module, and a drop pod bay unit. The one or more drop pods may be attached to the aircraft through the drop pod bay unit.

In some embodiments, the aircraft may be configured to receive, by the master mesh radio module over the mesh network, a mission plan from the GCS. The mission plan may comprise one or more commands. The flight control module may be configured to control the aircraft based on the one or more commands. The aircraft sensor array module may be configured to collect environmental data. Based on the environment data and the pod type of the one or more drop pods, one or more points of interest (POI) may be identified. The identifying may further comprise determining a POI type for each of the POIs. For each POI, a POI drop pod from the one or more drop pods may be selected. The selecting may be based on the pod type and the POI. The drop pod bay unit may deploy each of the selected POI drop pods. The deploying may comprise selecting a drop location and drop orientation based on the POI type and releasing the selected POI drop pod at the selected drop location.

In some embodiments, one or more of the one or more POIs may be a gas type POI, and the identification may be based in part on an altitude of the aircraft and a mesh network signal strength.

In some embodiments, one or more of the one or more POIs may be a camera type POI, and the identification may be based in part on a count corresponding to a number of doors and stairways encountered by the aircraft.

In some embodiments, one or more of the one or more POIs may be a mesh node type POI, and the identification may be based in part on a mesh network signal strength being below a predetermined threshold value.

In some embodiments, the pod sensor array module may comprise one or more RGB camera modules, one or more thermal camera modules, one or more microphone modules, one or more CO sensor modules, one or more O2 sensor modules, one or more PM2.5 sensor modules, one or more temperature sensor modules, one or more motion sensor modules, or one or more ultrasound transducer modules. In some embodiments, the aircraft sensor array module may comprise one or more RGB camera modules, one or more thermal camera modules, one or more microphone modules, one or more CO sensor modules, one or more O2 sensor modules, one or more PM2.5 sensor modules, one or more temperature sensor modules, one or more motion sensor modules, or one or more ultrasound transducer modules.

In some embodiments, the GCS may be configured to generate, by the GCS control module, a mission plan. The mission plan may comprise one or more flight paths and one or more mission objectives. The one or more flight paths may comprise a plurality of waypoints. The mission plan may be transmitted, over the slave mesh radio module, to the aircraft. The GCS may further be configured to receive, over the slave mesh radio module, aircraft status from the aircraft and pod status from each of the deployed POI drop pods. The GCS may be configured to generate, by the command UI module, a graphical user interface based on the received aircraft status and the received pod status of each of the deployed POI drop pods. The received aircraft status and the received pod status of each of the deployed POI drop pods may comprise one or more sensor readings. The one or more display units may display the graphical user interface.

In some embodiments, the GCS may further be configured to receive, by the command UI module, control input from a user. The control input may correspond to modification to the mission plan. The GCS control module may be configured to generate a modified mission plan based on the received control input. The modified mission plan may then be transmitted, by the slave mesh radio module, to the aircraft.

In some embodiments, the aircraft may further comprise a computer vision module. The aircraft may be further configured to capture, by the aircraft sensor array module, image data of the environment. The captured image data may be analyzed by the computer vision module. The computer vision module may further comprise one or more trained machine learning models. The aircraft may further be configured to autonomously modify the flight plan based on the analysis of the computer vision module. The modification of the flight plan may comprise adding or removing waypoints to the flight path and adding or removing mission objectives. In some embodiments, identifying the one or more POIs may be further based at least in part on the analysis of the computer vision module and the modification of the flight plan.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 6D is a diagram illustrating an exemplary drop pod in accordance with some embodiments.

DETAILED DESCRIPTION

Figure 1:
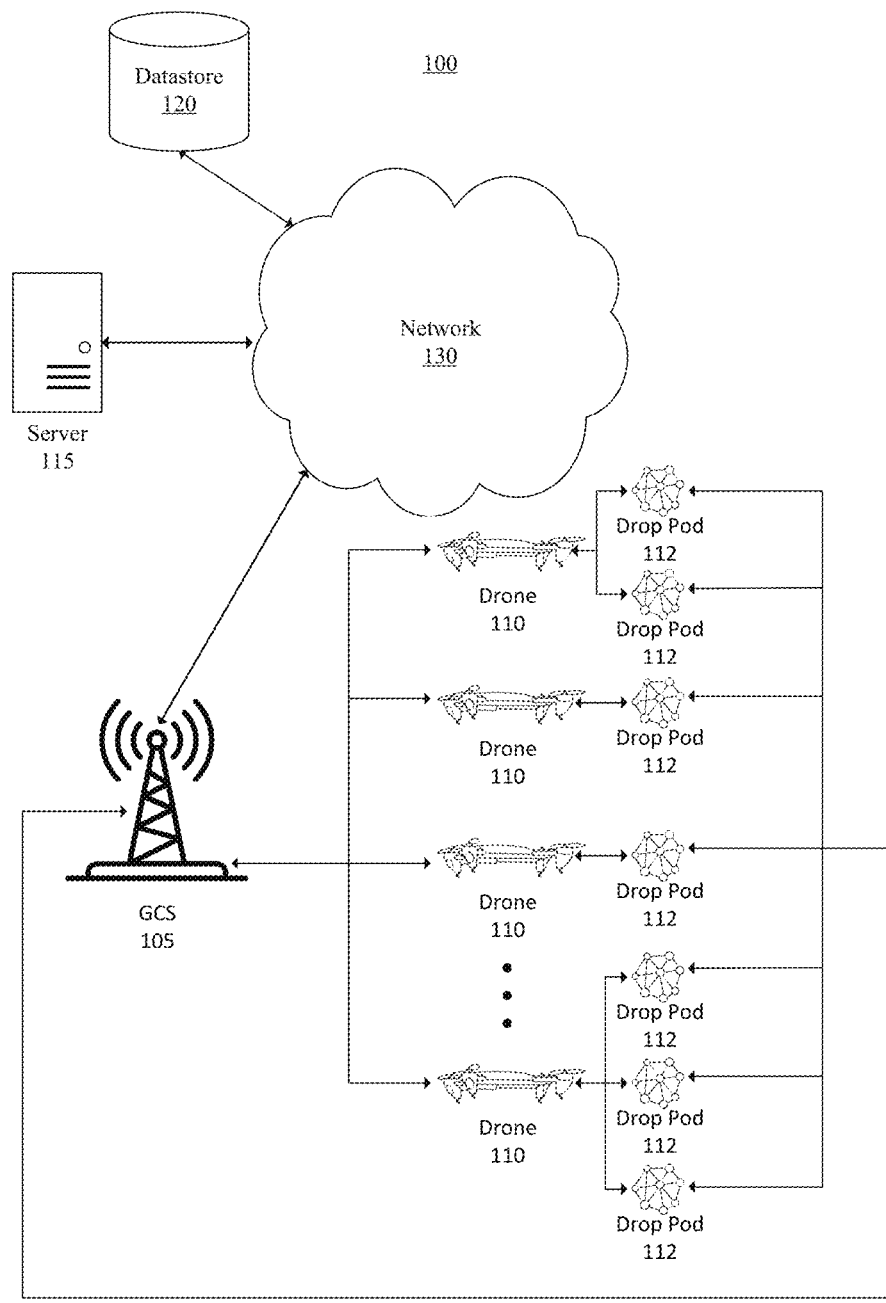
FIG. 1 is a diagram illustrating an exemplary autonomous drone mesh sensor deployment system in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, platform and methods for deploying a wireless mesh sensor array network. In some embodiments, the system may be utilized in dangerous situations such as fires, active shooter scenarios, urban warfare or hostage situations.

FIG. 1 is a diagram illustrating an exemplary autonomous drone mesh sensor deployment system 100 in which some embodiments may operate. The autonomous drone mesh sensor deployment system 100 may comprise one or more ground control stations (GCS) 105, one or more drones 110, one or more drop pods 112, one or more servers 115, one or more datastores 120 and one or more networks 130.

The one or more GCSs 105 may be connected to the one or more drones 110 and one or more drop pods 112 over one or more mesh networks. The GCSs may further be connected to the one or more server 115 and datastore 120 over network 130.

The one or more drones 110 may be configured to carry one or more drop pods 112 in a drop pod bay and deposit the one or more drop pods 112 during execution of a predetermined mission, autonomous navigation, under control of a user at the GCS 105 or combination thereof. The drones 110 may be configured to communicate, over a mesh network, with GCSs 105 and drop pods 112. The drones 110 may be configured to operate as nodes in the mesh network and relay data from one node to another node. The one or more drones 110 may further comprise one or sensor arrays.

The one or more drop pods 112 may comprise one or more sensor arrays. Data collected by the sensor array may then be transmitted from the drop pods 112 to the one or more drones 110 and/or one or more GCSs 105.

Server 115 may be one or more physical or virtual machines configured to communicate with the one or more GCSs 105 and the one or more datastores 120. The one or more servers 115 may be configured as a distributed computing infrastructure and processing of applications and other software may be carried out on the cloud.

Datastores 120 may communicate with one another over network 130. Datastores 120 may be any storage device capable of storing data for processing or as a result of processing information at the GCSs 105, drones 110, drop pods 112 and/or servers 115. The datastores 120 may be a separate device or the same device as server 115. The datastores 120 may be located in the same location as that of server 115, or at separate locations.

Network 130 may be an intranet, internet, mesh, LTE, GSM, peer-to-peer or other communication network that allows the one or more servers 115 to communicate with the one or more GCSs 105 and datastores 115.

Figure 2A:
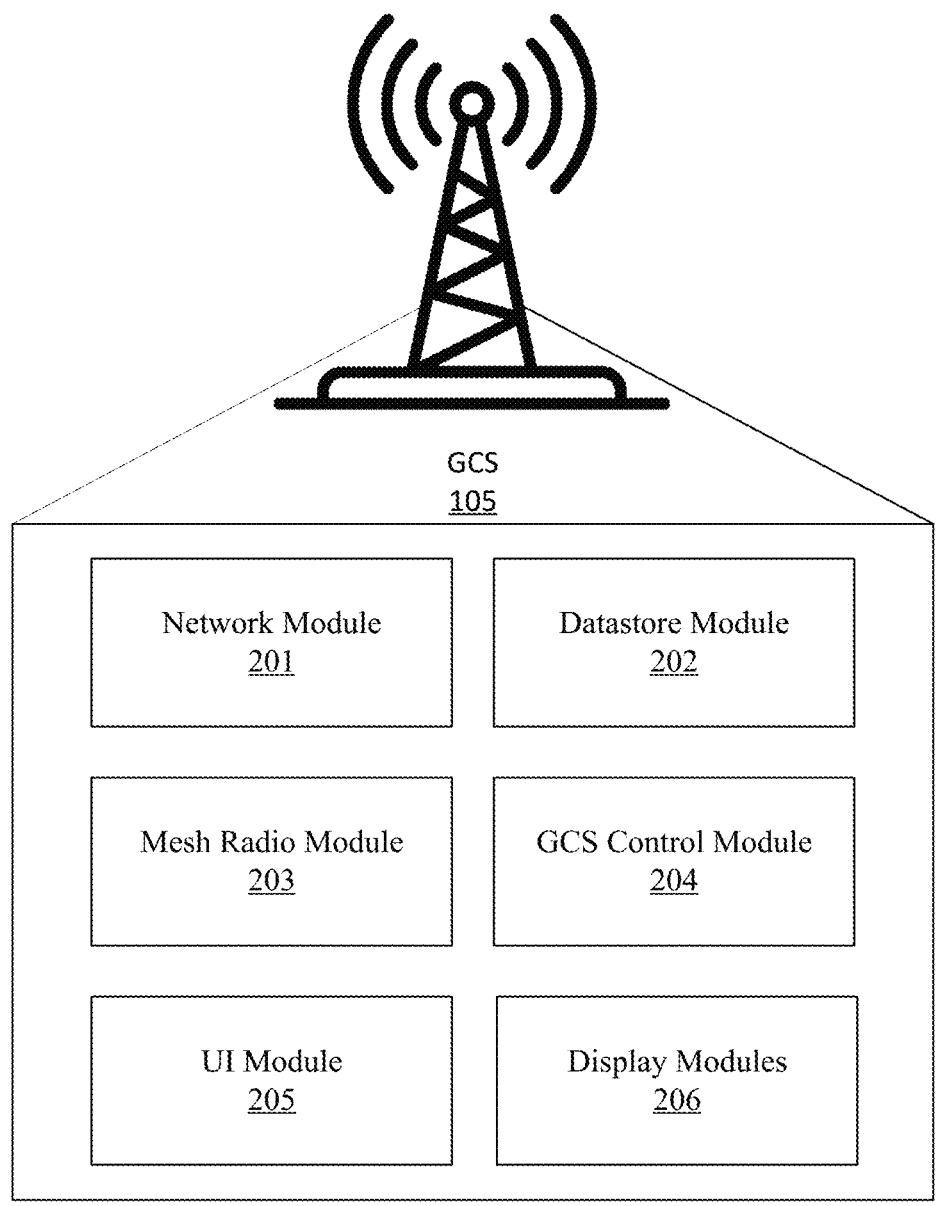
FIG. 2A is a diagram illustrating a ground control station (GCS) in accordance with aspects of the present disclosure.

FIG. 2A is a diagram illustrating an exemplary ground control station (GCS) 105 in accordance with aspects of the present disclosure. GCS 105 may comprise network module 201, datastore module 202, a mesh radio module 203, a GCS control module 204, a UI module 205 and one or more display modules 206.

Network module 201 may transmit and receive data from other computing systems via a network such as network 130 as described above with regard to FIG. 1. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating at the GCS 105. The one or more modules operating at the GCS 105 may also retrieve information from the datastore module 202. Datastore module 202 may also be configured to receive and store information received over network module 201 or through mesh radio module 203.

Mesh radio module 203 may be configured to send and receive data over one or more wireless communications protocols. In some embodiments, the mesh radio module 203 may communicate over sub 1 ghz bands, such as LORAWAN or ZIGBEE. In some embodiments, the mesh radio module 203 may communicate over LPWAN, Bluetooth, BLE, WIFI (802.11/802.15/802.16), GSM, LTE, or other cellular protocols. The mesh radio module 203 may further be any wireless communication technology capable of communication between nodes. In some embodiments, the mesh radio module 203 may further comprise one or more radio antennas. The radio antennas may be directional or omnidirectional.

GCS control module 204 may be configured to generate mission plans for one or more aircraft. The mission plans may comprise one or more mission objectives and one or more flight paths. The flight paths may comprise one or more waypoints. In some embodiments the GCS control module 204 may collect data from the one or more aircrafts. The GCS control module 204 may be configured to command the one or more aircraft to deploy one or more drop pods carried by the aircraft. The GCS module may further be configured to collect and analyze data received, through mesh radio module 203, from the one or more aircraft and the one or more drop pods.

UI module 205 may be configured to generate one or more graphical user interfaces based on the generated mission plans, the received data from the one or more aircraft and one or more drop pods, the analysis performed by the GCS control module 204 and the state/status of the aircrafts and drop pods. The UI module 205 may also be configured to receive commands from one or more users, wherein the one or more received commands are associated with one or more of the aircraft and/or the one or more drop pods. Received commands may be processed by the GCS control module 204 and relayed to the one or more aircraft and/or one or more drop pods. The received commands may be used to generate one or more modifications to the mission plan.

Display modules 206 may be configured to display information related to the state/status of the one or more aircraft and one or more drop pods. Information collected from the one or more aircraft and one or more drop pods may also be displayed.

Figure 2B:
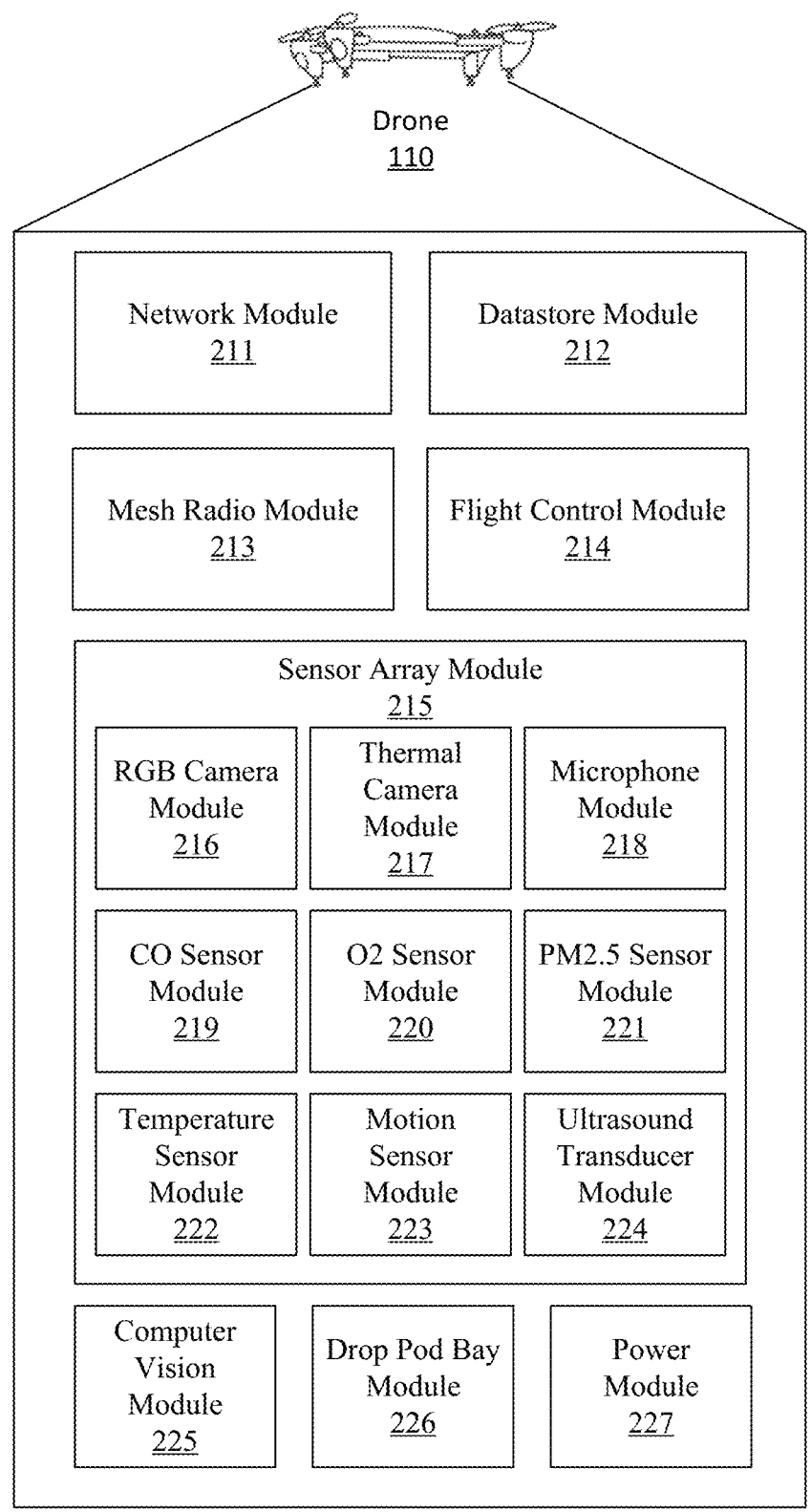
FIG. 2B is a diagram illustrating an exemplary drone in accordance with aspects of the present disclosure.

FIG. 2B is a diagram illustrating an exemplary drone 110 in accordance with aspects of the present disclosure. Drone 110 may comprise network module 211, datastore module 212, mesh radio module 213, flight control module 214, sensor array module 215, computer vision module 225, drop pod bay module 226 and power module 227.

Network module 211 and datastore module 212 may be the same or similar to that of network module 201 and datastore module 202 as described above with regard to FIG. 2A.

Mesh radio module 213 may be the same or similar to that of mesh radio module 203 as described above with regard to FIG. 2A.

Flight control module 214 may be configured to control flight parameters of the aircraft. Flight control module 214 may be configured to generate control signals for one or more motors, actuators, sensors or other modules of the aircraft based at least in part on a mission plan received over the mesh radio module 213.

Sensor array module 215 may comprise one or more RGB camera modules 216, thermal camera modules 217, microphone modules 218, CO sensor modules 219, O2 sensor modules 220, PM2.5 sensor modules 221, temperature sensor modules 222, motion sensor modules 223, and/or ultrasound transducer modules 224. The sensors of the sensor array module 215 may be configured to collect, filter and/or process sensor data from the environment around the aircraft. The sensor data may be transmitted to the GCS over mesh radio module 213. Sensor data may also be analyzed by the flight control module 214.

Computer vision module 225 may be configured to analyze images collected by one or more of the sensors of the sensor array module 215. The computer vision module may use one or more trained machine learning models to perform the analysis.

Drop pod bay module 226 may be configured to securely hold and transport one or more drop pods during mission operation. The drop pod bay module 226 may further comprise one or more mechanisms configured to selectively secure and/or release the one or more drop pods. In some embodiments, one or more magnetic grasping units may be used to hold the one or more drop pods in place and/or retrieve previously deployed drop pods. The magnetic grasping units may be electromagnetic devices. Deployment of drop pods may be facilitated by disabling the electromagnetics. Conversely, retrieval and carrying of the drop pods may be facilitated by energizing the electromagnetic devices.

In some embodiments, the drip pod bay module 226 may employ latch mechanisms and articulated grasping units to retrieve, secure and release the drop pods.

Power module 227 may comprise one or more electrical power storage units and/or one or more electrical power sources, such as battery modules, solar energy/photovoltaic modules, inductive electricity receivers, electric generators or combination thereof.

Figure 2C:
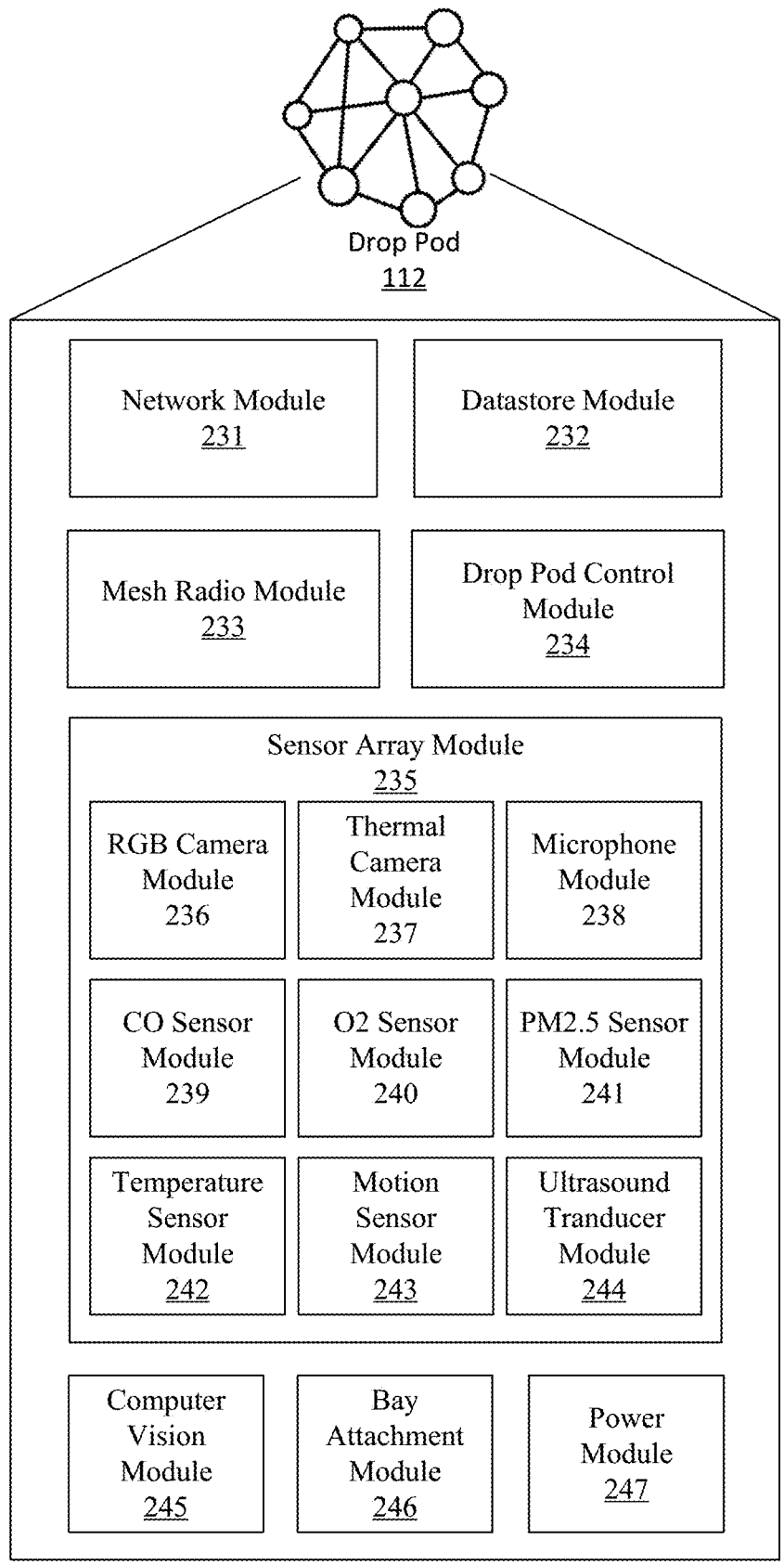
FIG. 2C is a diagram illustrating an exemplary drop pod in accordance with aspects of the present disclosure.

FIG. 2C is a diagram illustrating an exemplary drop pod 112 in accordance with aspects of the present disclosure. Drop pod 112 may comprise network module 231, datastore module 232, mesh radio module 233, drop pod control module 234, sensor array module 235, computer vision module 245, bay attachment module 246 and power module 247.

Network module 231 and datastore module 232 may be the same or similar to that of network module 201 and datastore module 202 as described above with regard to FIG. 2A.

Mesh radio module 233 may be the same or similar to that of mesh radio module 203 as described above with regard to FIG. 2A and mesh radio module 213 as described above with regard to FIG. 2B.

Drop pod control module 234 may be configured to analyze sensor data from the sensor array module 235 and perform operations associated with the mission plan or commands received over the mesh network.

Sensor array module 235 may comprise one or more RGB camera modules 236, thermal camera modules 237, microphone modules 238, CO sensor modules 239, O2 sensor modules 240, PM2.5 sensor modules 241, temperature sensor modules 242, motion sensor modules 243, and/or ultrasound transducer modules 244. Sensor array module 235 may be the same or similar to that of sensor array module 215 as described above with regard to FIG. 2B.

Computer vision module 245 and power module 247 may be the same or similar to that of computer vision module 225 and power module 227 215 as described above with regard to FIG. 2B.

Bay attachment module 246 may be configured to interface with drop pod bay module 226 of the aircraft, facilitating the retrieval, carrying and deployment of the drop pod. The bay attachment module 246 may be electromagnets, permanent magnets, latches or other retaining devices.

Figure 2D:
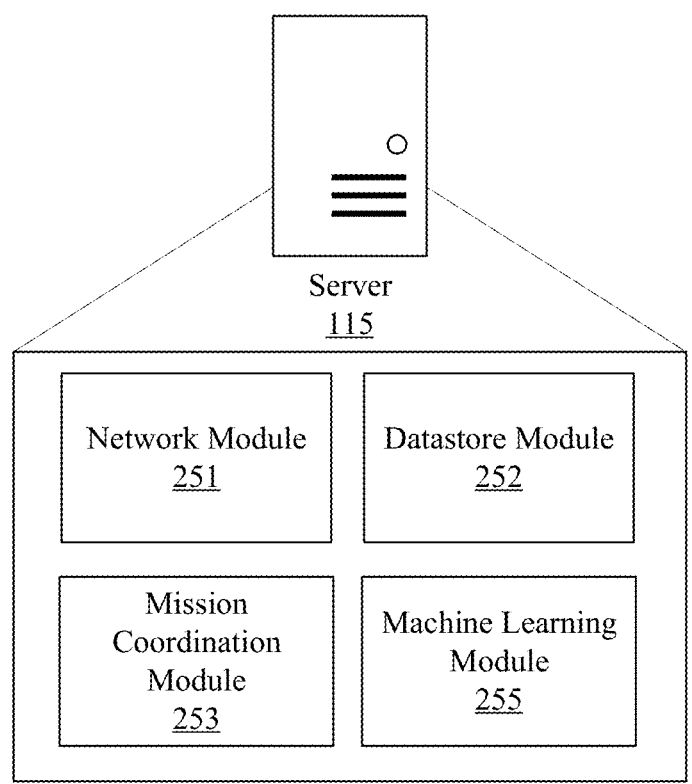
FIG. 2D is a diagram illustrating an exemplary server in accordance with aspects of the present disclosure.

FIG. 2D is a diagram illustrating an exemplary server 115 in accordance with aspects of the present disclosure. Server 115 may comprise network module 251, datastore module 252, mission coordination module 253 and machine learning module 255.

Network module 251, may be the same or similar to that of network module 201 in FIG. 2A and will not be described for the sake of brevity.

Datastore module 252 may be the same or similar to that of datastore module 202 in FIG. 2A and will not be described for the sake of brevity.

Mission coordination module 253 may be configured to coordinate communication and command control of aircraft and drop pods between a plurality of GCSs.

Machine learning module 255 may be configured to train and generate one or more machine learning models used by the computer vision modules 225 and 245. In some embodiments, the machine learning module may further generate models corresponding to path planning and POI determination.

Figure 3:
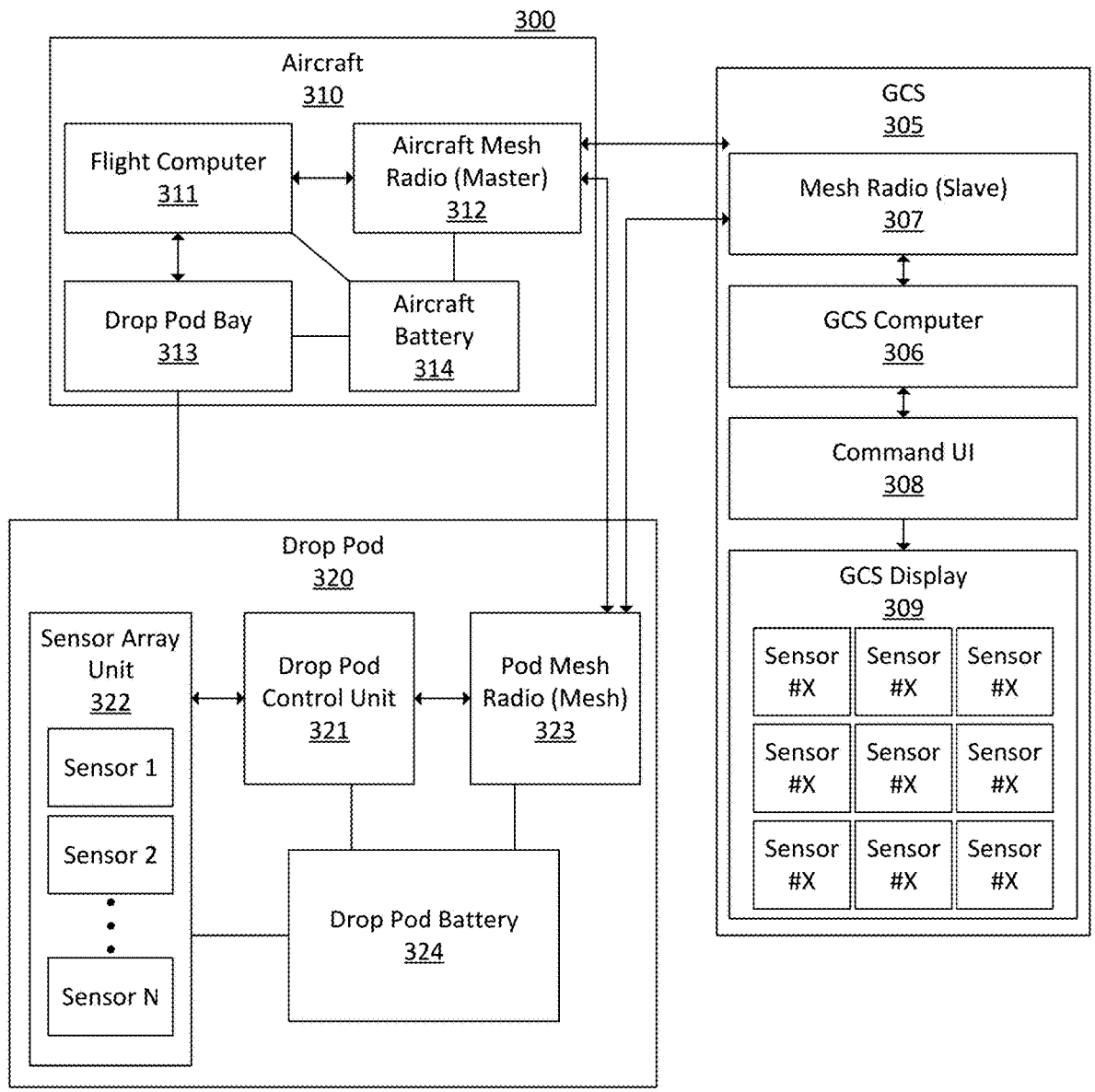
FIG. 3 is a diagram illustrating an exemplary sensor deployment system in accordance with some embodiments.

FIG. 3 is a diagram illustrating an exemplary sensor deployment system 300 in accordance with some embodiments. The sensor deployment system 300 may comprise one or more GCSs, one or more aircrafts 310 and one or more drop pods 320.

Each of the one or more GCSs 305 may comprise one or more GCS computers 306, mesh radios (slave) 307, command UIs 308 and GCS displays 309.

The GCS computers 306 may be configured to receive, over the mesh radios (slave) 307, and analyze data received from the one or more aircraft and one or more drop pods. The data received may correspond to status/state data of the aircraft and drop pods and/or collected sensor data from the aircraft and drop pods. The GCS computers may also generate mission plans and control commands for the aircraft and drop pods and transmit said mission plans and control commands over the mesh radios (slave) 307.

The command UIs 308 may be configured to generate one or more graphical user interfaces and one or more command interfaces corresponding to the aircrafts and drop pods.

The GCS displays 309 may be configured to display the one or more graphical user interfaces generated by the command UIs 308.

The one or more aircrafts 310 may comprise one or more flight computers 311, aircraft mesh radios (master) 312, drop pod bays 313 and aircraft batteries 314. The structure and operation of aircraft 310 are described above with regard to FIG. 2B.

The one or more drop pods 320 may comprise one or more drop pod control units 321, sensor array units 322, pod mesh radios (mesh) 323 and drop pod batteries 324. The structure and operation of drop pods 320 are described above with regard to FIG. 2C.

Figure 4A:
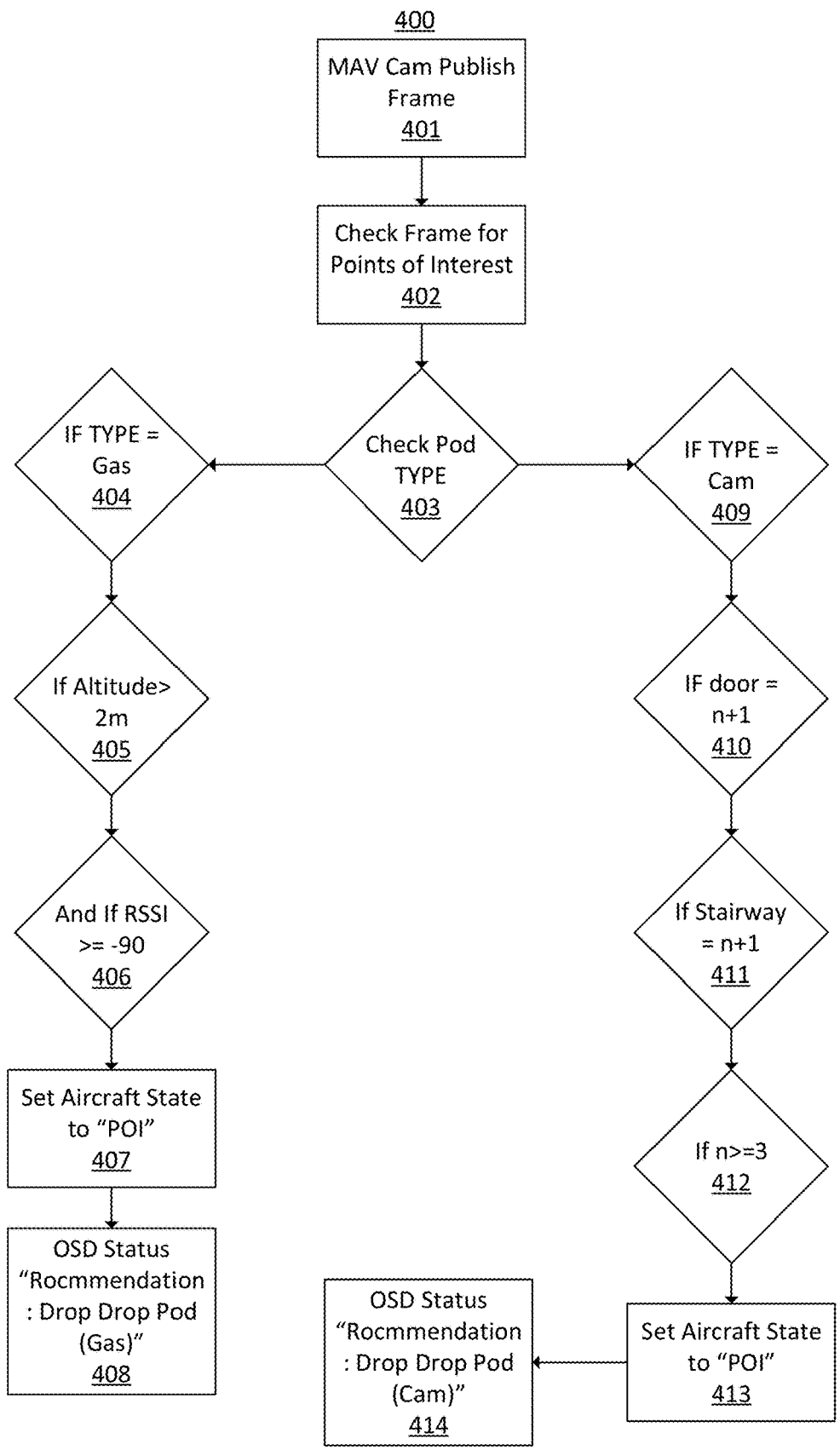
FIG. 4A is a flow chart illustrating an exemplary method that may be performed in accordance with some embodiments.

FIG. 4A is a flow chart illustrating an exemplary process flow 400 that may be performed in accordance with some embodiments.

At step 401, an aircraft or drop pod of the system may be configured to publish one or more MAV Cam frames. The MAV Cam frames may be published directly to a GCS, a server, through a cloud service or combination thereof. The publishing may be performed over the mesh radio network and/or other wireless network.

At step 402, the system may be configured to check the frame for points of interest (POIs). If one or more POIs are identified, the system may then proceed to step 403.

At step 403, the system may be configured to check the pod type. If the pod type is "Gas" the system proceeds through step 404 to step 405. If the pod type is "Cam" the system proceeds through step 409 to step 410.

At step 405, the system may be configured to determine an altitude of the aircraft and the attached pod. If the altitude is above 2 meters, the system proceeds to step 406.

At step 406, the system may be configured to check a signal strength of the mesh network. If the RSSI of the network is greater than or equal to −90, the system proceeds to step 407.

At step 407, the system may be configured to set the aircraft state to "POI".

At step 408, the system may be configured to set an on screen display (OSD) status to "Recommendation: Drop Drop Pod (Gas)". The OSD status may then be displayed as a prompt or notification to a user/controller through an OSD at a GCS.

At step 410, when the type has been determined to be "Cam," the system may be configured to keep track of a POI count. The system may also be configured to identify doors within the environment. In some embodiments, the system may be configured to increment the POI count upon the aircraft passing through a door and/or identifying a door.

At step 411, the system may further be configured to identify stairways within the environment. The system may increment the POI count upon taking a stairway and/or identifying a stairway.

At step 412, the system may be configured to determine if the POI count has reached or exceeded a predetermined threshold value. For example, the POI count may be set to a value such as "3" as is the case in FIG. 4A. If the POI count is greater than or equal to the predetermined threshold, the system proceeds to step 413.

At 413, the system may be configured to set the aircraft state to "POI" and proceed to step 414.

At step 414, the system may be configured to set the OSD status to "Recommendation: Drop Drop Pod (Cam)". The OSD status may then be displayed as a prompt or notification to a user/controller through an OSD at a GCS.

Figure 4B:
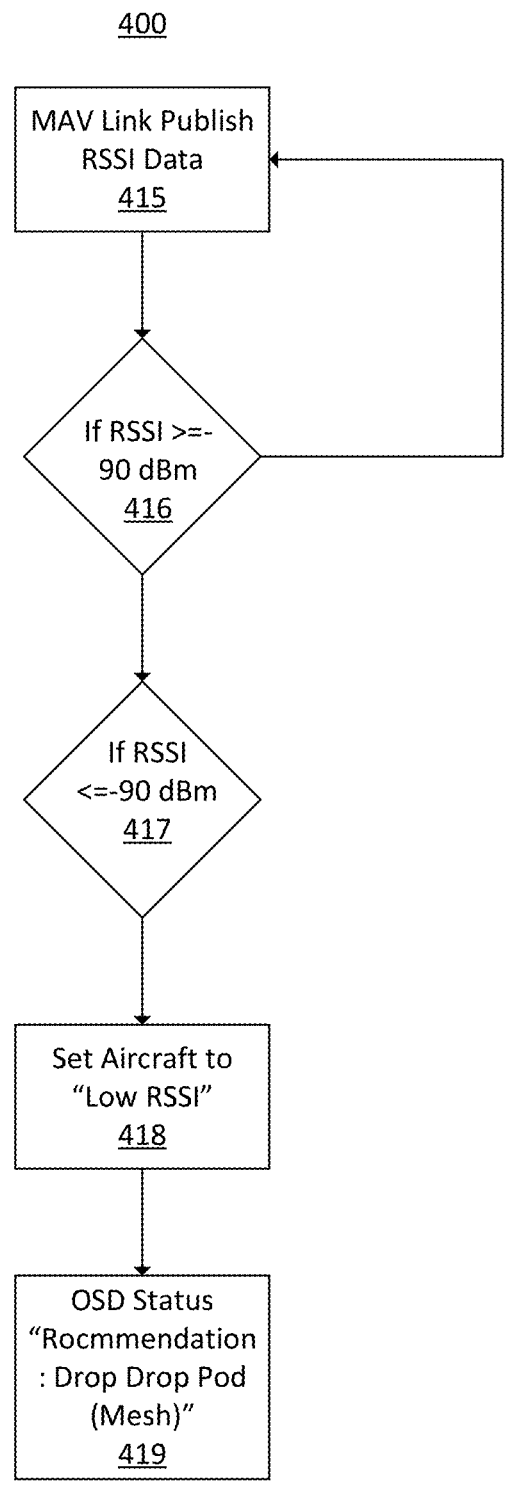
FIG. 4B is a flow chart illustrating an exemplary method that may be performed in accordance with some embodiments.

FIG. 4B is a flow chart illustrating an exemplary process flow 400 that may be performed in accordance with some embodiments.

At step 415, an aircraft or drop pod of the system may be configured to publish MAV Link RSSI data. The MAV Link RSSI data may be published directly to a GCS, a server, through a cloud service or combination thereof. The publishing may be performed over the mesh radio network and/or other wireless network.

At step 416, if the published RSSI is greater than or equal to a predetermined threshold value, such as −90 db as shown in FIG. 4B, the system returns to step 415. If the RSSI value is less than the predetermined threshold value the system may proceed through step 417 to step 418.

At step 418, the system may be configured to set the aircraft state to "Low RSSI" and proceed to step 419.

At step 419, the system may be configured to set the OSD status to "Recommendation: Drop Drop Pod (Mesh)". The OSD status may then be displayed as a prompt or notification to a user/controller through an OSD at a GCS.

Figure 5:
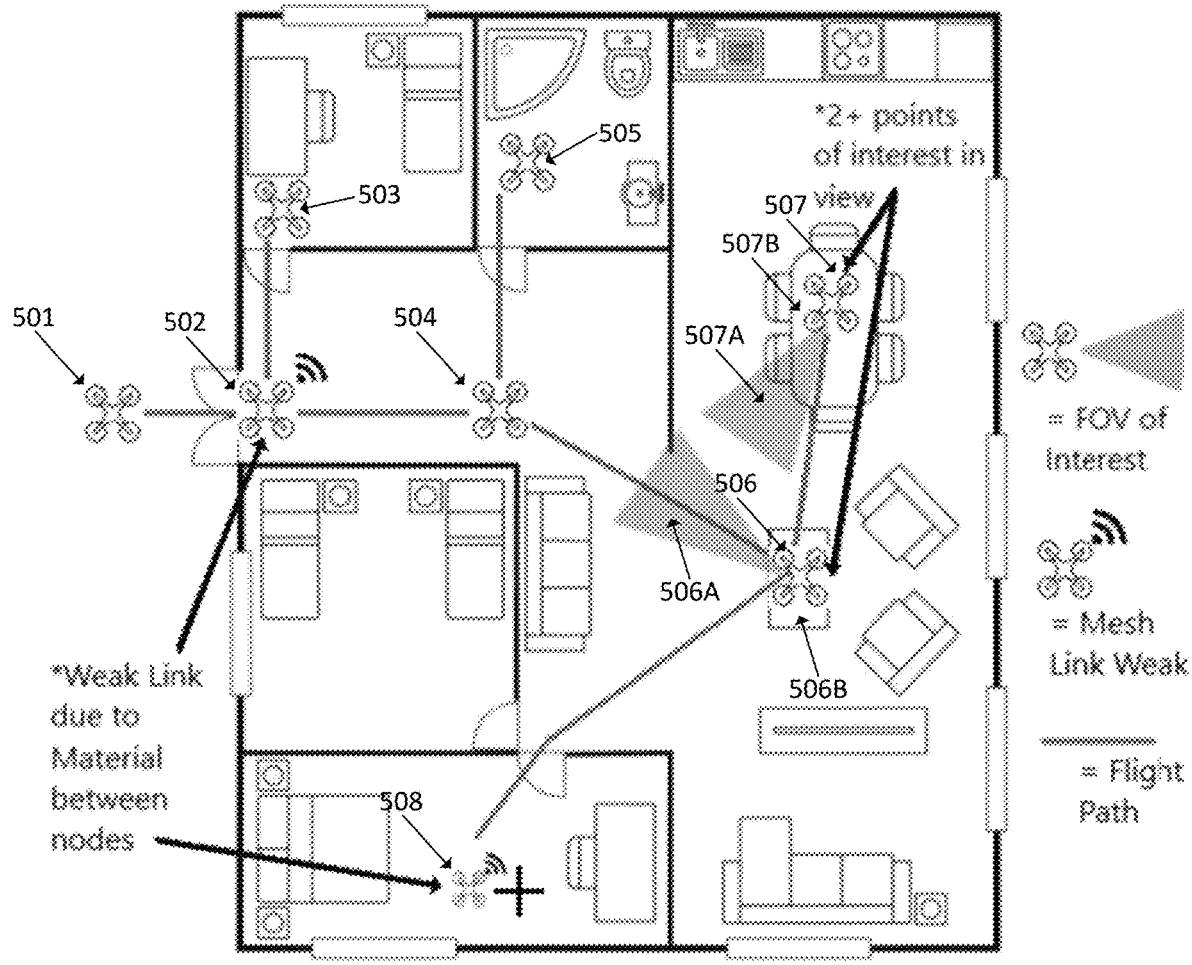
FIG. 5 is a diagram illustrating an exemplary mission that may be performed in accordance with some embodiments.

FIG. 5 is a diagram illustrating an exemplary mission 500 that may be performed in accordance with some embodiments. An aircraft, in accordance with some embodiments, is shown performing a mission within a building. The process flows from FIGS. 4A and 4B may be used in the exemplary mission to identify POIs and determine locations to drop one or more drop pods. The aircraft starts at waypoint 501 and proceeds to enter the building/building unit through a doorway at waypoint 502. In this example, upon reaching waypoint 502, the aircraft and/or GCS may determine that the mesh radio strength is below a predetermined threshold value. The aircraft may then be instructed to drop a mesh radio drop pod to increase communication coverage within the building. The aircraft may then continue to explore the building/building unit by following a flight path to additional waypoints. The flight path may be generated by a user/controller before the beginning of the mission or in real time during operation of the mission. In some embodiments, a pregenerated flight path may be modified or changed during operation of the mission. The modification/changes to the mission may be initiated by the user/controller based on data received (video frames, sensor readings, signals strength) from the aircraft. In some embodiments, modification/changes to the mission may be initiated by the aircraft itself in an autonomous manner. In some embodiments, the aircraft itself or a GCS system may be configured to generate the flight path of the aircraft in an autonomous manner and in real-time. In some embodiments, computer vision may be used to identify POIs, obstacles, people, animals, furniture and other objects within proximity to the aircraft.

After dropping the mesh radio drop pod at waypoint 502, the aircraft may be instructed/decide to proceed along a flight path. As shown in the example of FIG. 5, the aircraft proceeds to waypoint 503, 504, 505 and to 506. At waypoint 506 the aircraft may identify a POI based on one or more sensor readings or identified objects in the room. In the example, at waypoint 506 the aircraft may identify a POI corresponding to the placement of a camera drop pod. The determination may be based on the identification of doors encountered along the flight path. The aircraft may further identify one or more locations at which to place the camera drop pod. For example, the aircraft may identify a table or flat surface upon which to place the camera drop pod and determine a direction in which to orient the camera drop pod. In some embodiments, a field of view (FOV) of interest may be determined, and the placement/orientation of the camera drop pod may be determined based on the FOV of interest. As shown in FIG. 5, at waypoint 506, a FOV of interest 506A is determined and a drop location 506B is identified for the camera drop pod. The aircraft may then be instructed to place the camera drop pod at drop location 306B in an orientation corresponding to the FOV of interest 506A. The aircraft may then proceed along the flight path to waypoint 507. Similarly, at waypoint 507, a FOV of interest 507A may be identified and a drop pod may be placed at drop location 507B. The determination of the FOV of interest 507A, drop location 507B and orientation of the drop pod may be similar to or the same as that described above with regard to waypoint 506. In some embodiments, the drop pod deployed at waypoint 506 and/or 507 may be a gas drop pod configured to analyze the air within the room. In some embodiments, the drop pod may be a multisensory drop pod, comprising a plurality of sensors. For example, the drop pods dropped at waypoints 506 and 507 may include one or more cameras, microphones, gas sensors, ultrasonic transducers and/or mesh radio transceivers.

In the exemplary mission, the aircraft may then continue on the flight path to waypoint 508. As shown in the example of FIG. 5, the mesh radio strength at waypoint 508 may be determined to be below the predetermined threshold value. The aircraft may then be instructed to drop a mesh radio drop pod in a similar manner to that performed at waypoint 502.

Figure 6A:
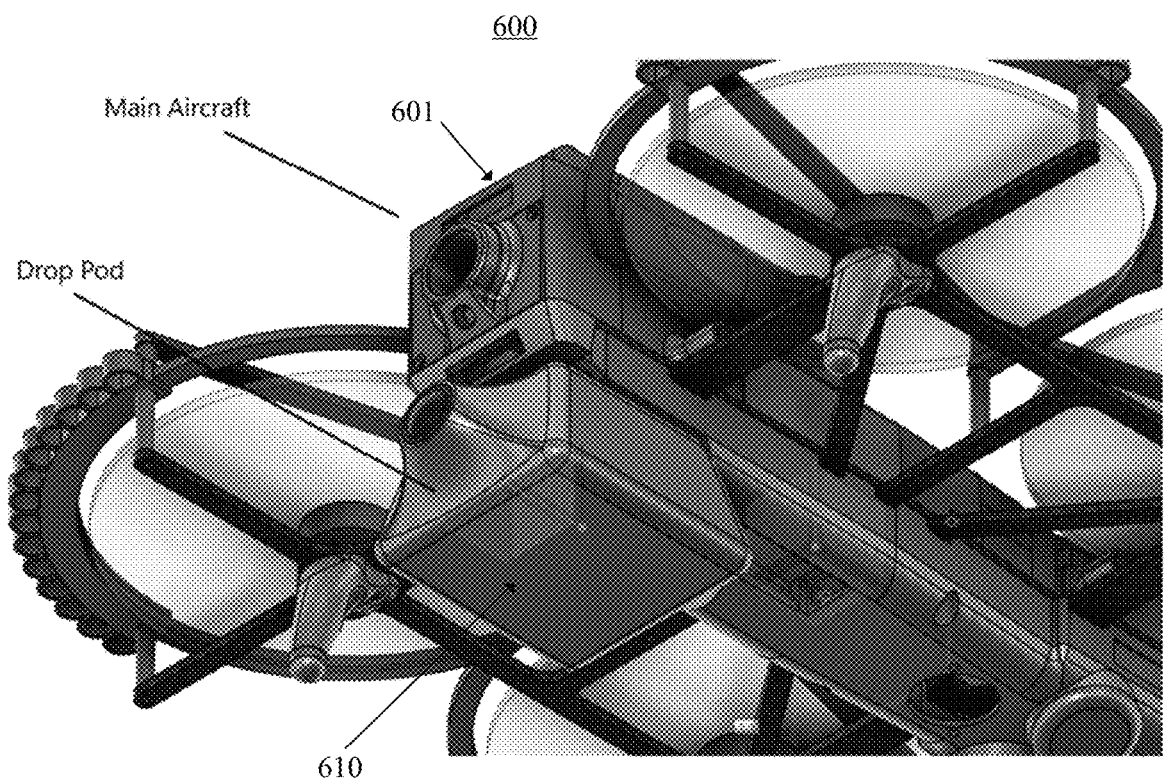
FIG. 6A is a diagram illustrating an exemplary autonomous drone and drop pod in accordance with some embodiments.
Figure 6B:
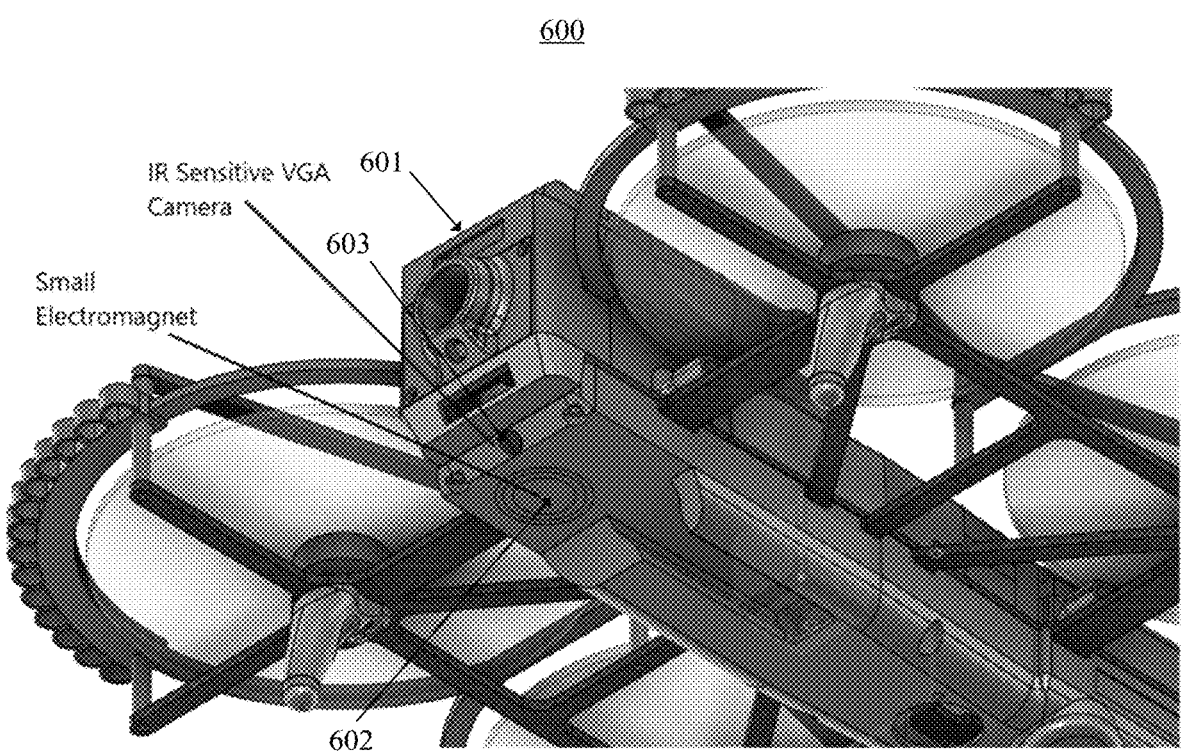
FIG. 6B is a diagram illustrating an exemplary autonomous drone after deployment of a drop pod in accordance with some embodiments.

FIGS. 6A-6D are diagrams illustrating the functioning of an exemplary autonomous drone drop pod system 600 in accordance with some embodiments. The autonomous drone drop pod system 600 may comprise a main aircraft 601, one or more pod attachment mechanisms 602, one or more aircraft sensors 603 and one or more drop pods 610. FIG. 6A shows the main aircraft 601 with an attached drop pod 610. In some embodiments, there may be more than one drop pod attached to the main aircraft 601. FIG. 6B shows the main aircraft 601 after deployment of the drop pod 610 of FIG. 6A. As shown in FIG. 6B, the main aircraft 601 may include an electromagnet as the pod attachment mechanism 602. In some embodiments, the pod attachment mechanism may be a mechanical and/or magnetic mechanism configured to hold the one or more drop pods 610 securely in place. The main aircraft 601, as shown in FIG. 6B also includes an infrared sensitive camera sensor 603. In some embodiments, the one or more sensors 603 may include sensors for analyzing the environment of the aircraft and/or locating the one or more drop pods 610. For example, the aircraft may have a plurality of sensors including video cameras, infrared cameras, thermal cameras, ultrasonic transducers, microphones and/or inductive proximity sensors.

Figure 6C:
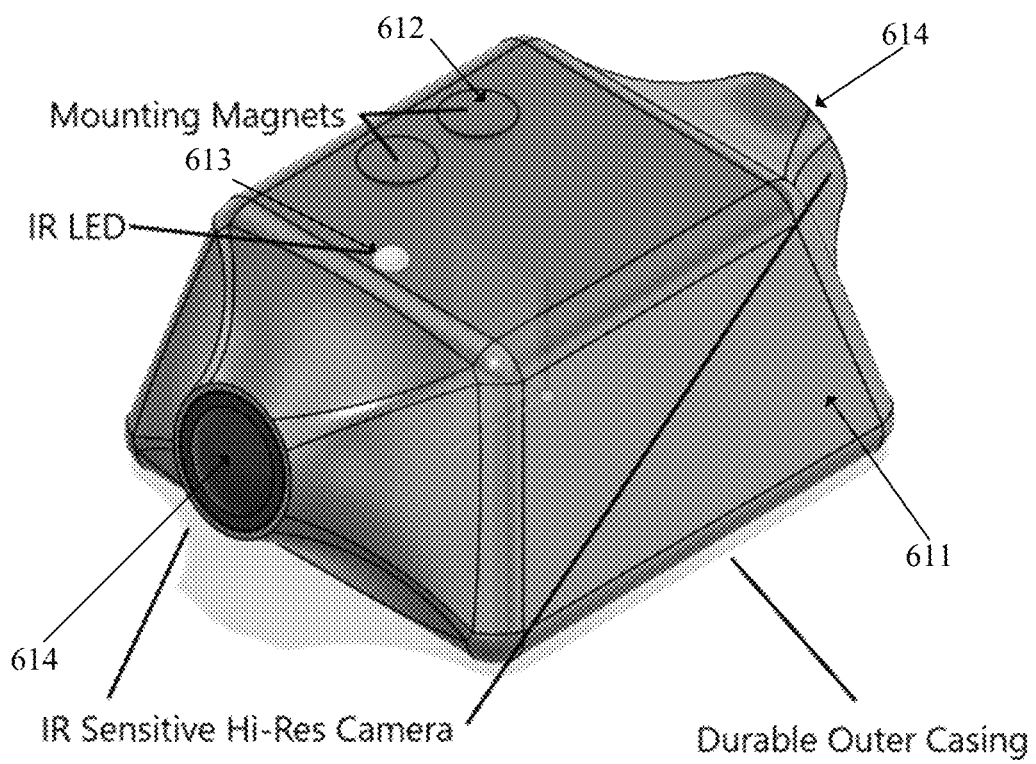
FIG. 6C is a diagram illustrating an exemplary drop pod in accordance with some embodiments.
Figure 6B:
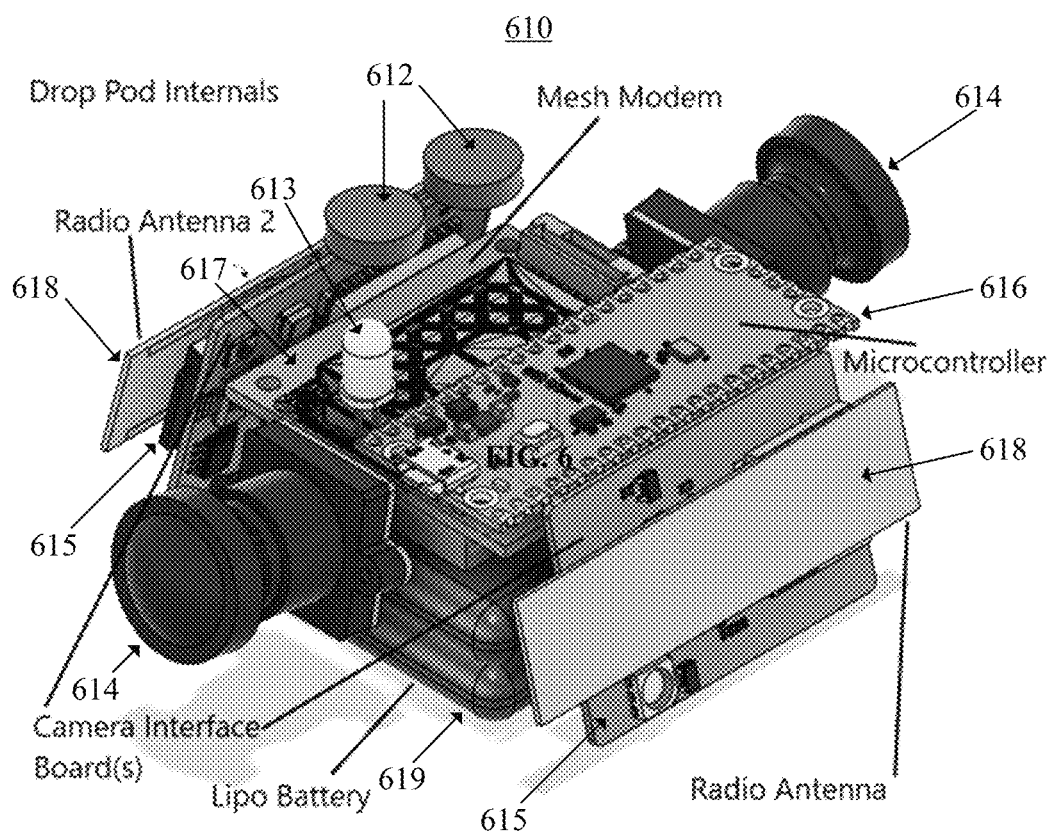

With regard to FIG. 6C, the drop pod 601 is shown comprising an outer casing 611, mounting magnets 612, an IR LED light 613 and two IR sensitive cameras 614. In some embodiments, the mounting magnets 612 may be mounting hardware for the one or more pod attachment mechanisms 602 of the aircraft. In some embodiments, the IR sensitive cameras 614 may be cameras capable of capturing a wide spectrum of light. The type of camera and spectrum of capture of the drop pod cameras 614 may be determined based on the mission and environment in which the drop pod is to be placed. In some embodiments, a single camera may be used. In some embodiments, a plurality of cameras may be used by the drop pod, and the position and orientation of the plurality of cameras may be environment and mission specific.

FIG. 6D is a diagram illustrating the internal components of the drop pod 610. The drop pod 610 may further comprise one or more camera interface boards 615, one or more microcontrollers 616, one or more mesh modems 617, one or more radio antennas 618 and one or more batteries 619. In some embodiments, the one or more microcontrollers may correspond to the drop pod control module 234 as described with regard to FIG. 2C.

Figure 7:
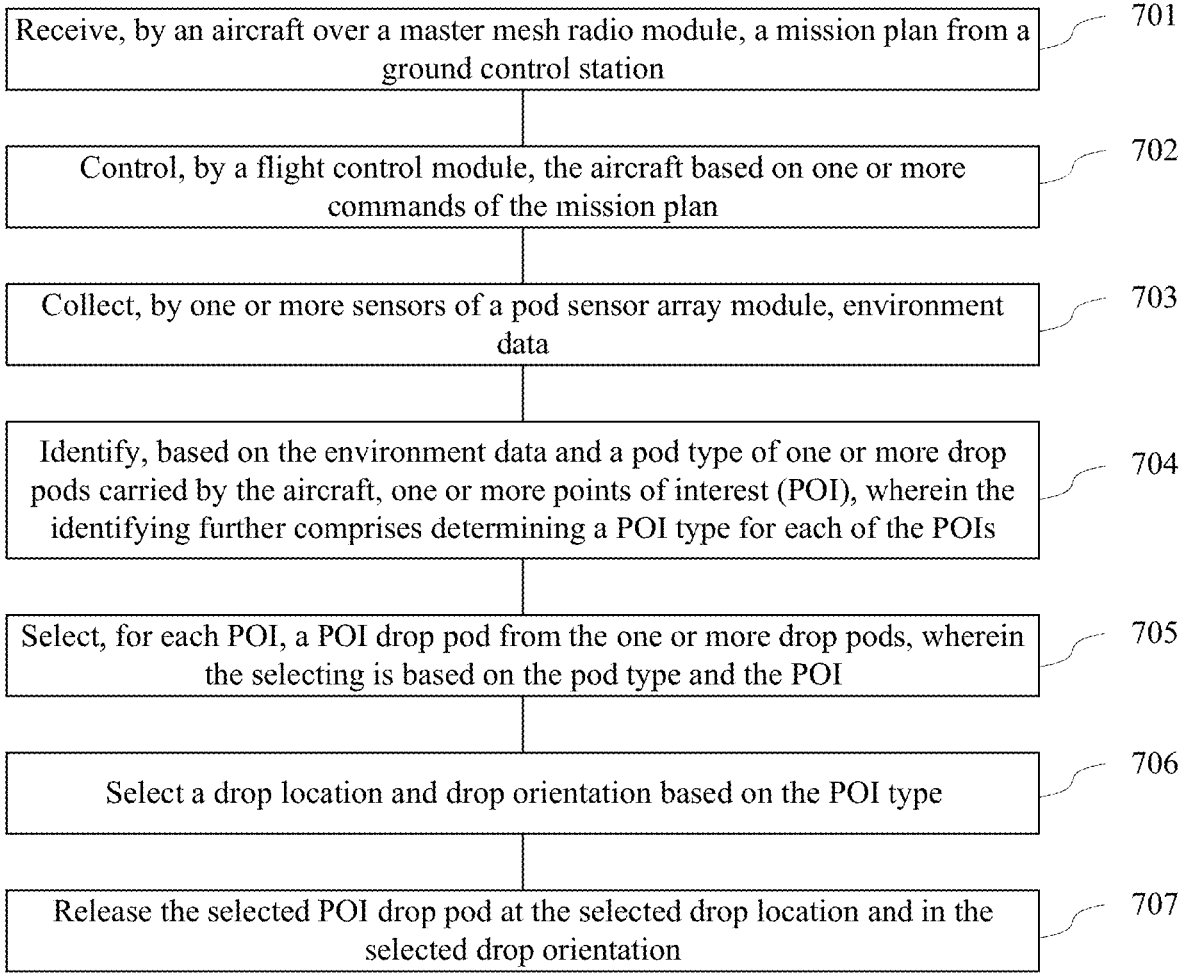
FIG. 7 is a flow chart illustrating an exemplary method that may be performed in accordance with some embodiments.

FIG. 7 is a flow chart illustrating an exemplary method 700 that may be performed in accordance with some embodiments.

At step 701, the system is configured to receive, by an aircraft over a master mesh radio module, a mission plan from a ground control station.

At step 702, the system is configured to control, by a flight control module, the aircraft based on one or more commands of the mission plan.

At step 703, the system is configured to collect, by one or more sensors of a pod sensor array module, environment data.

At step 704, the system is configured to identify, based on the environment data and a pod type of one or more drop pods carried by the aircraft, one or more points of interest (POI), wherein the identifying further comprises determining a POI type for each of the POIs.

At step 705, the system is configured to select, for each POI, a POI drop pod from the one or more drop pods, wherein the selecting is based on the pod type and the POI.

At step 706, the system is configured to select a drop location and drop orientation based on the POI type.

At step 707, the system is configured to release the selected POI drop pod at the selected drop location and in the selected drop orientation.

Figure 8:
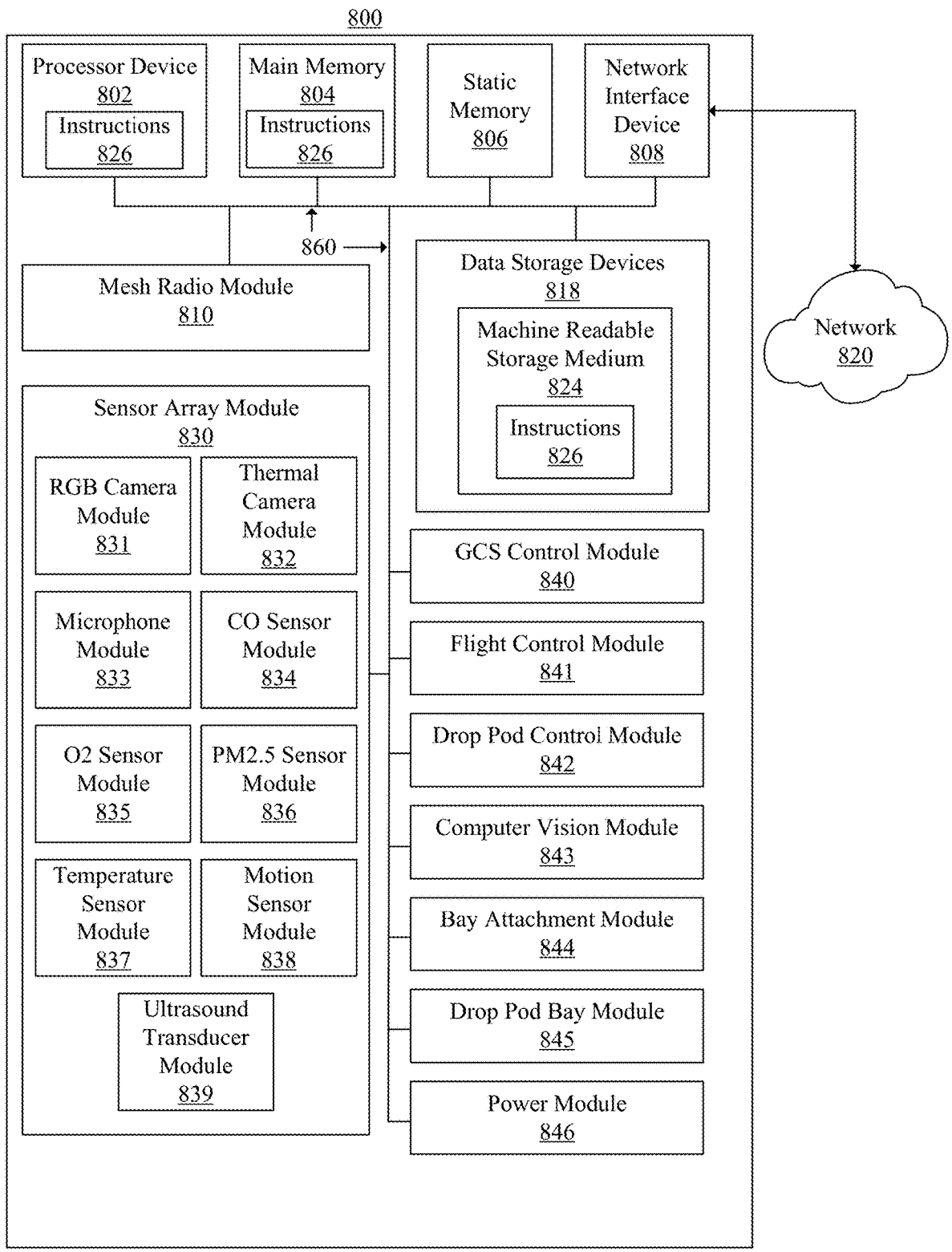
FIG. 8 is a diagram illustrating an exemplary computer/control system that may perform processing in some embodiments and in accordance with aspects of the present disclosure.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 860.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 508 to communicate over the network 820.

The computer system 800 may also include a mesh radio module 810, sensor array module 830, GCS control module 840, flight control module 841, drop pod control module 842, computer vision module 843, bay attachment module 844, drop pod bay module 845 and power module 846. The sensor array module may further comprise one or more RGB camera modules 831, thermal camera modules 832, microphone modules 833, CO sensor modules 834, O2 sensor modules 835, PM2.5 sensor modules 836, temperature sensor modules 837, motion sensor modules 838, and/or ultrasound transducer modules 839.

Mesh radio module 810, sensor array module 830, RGB camera modules 831, thermal camera modules 832, microphone modules 833, CO sensor modules 834, O2 sensor modules 835, PM2.5 sensor modules 836, temperature sensor modules 837, motion sensor modules 838, ultrasound transducer modules 839, flight control module 841, computer vision module 843, drop pod bay module 845 and power module 846 may be the same or similar to mesh radio module 213, sensor array module 215, RGB camera modules 216, thermal camera modules 217, microphone modules 218, CO sensor modules 219, O2 sensor modules 220, PM2.5 sensor modules 221, temperature sensor modules 222, motion sensor modules 223, ultrasound transducer modules 224, flight control module 214, computer vision module 225, drop pod bay module 226 and power module as disclosed in FIG. 2B.

GCS control module 840 may be the same or similar to GCS control module 204 as disclosed in FIG. 2A.

Drop pod control module 842 and bay attachment module 844 may be the same or similar to drop pod control module 234 and bay attachment module 246 as disclosed in FIG. 2C.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media. Information, including data used in the processes and methods of the system and the one or more sets of instructions or software, may also be stored in blockchain, as NFTs or other decentralized technologies.

In one implementation, the instructions 826 include instructions to implement functionality corresponding to the components of a device to perform the disclosure herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A mesh sensor deployment system, the mesh sensor deployment system comprising: a mesh network comprising a ground control station (GCS), an aircraft and one or more drop pods, and wherein the GCS comprises: GCS control module; a slave mesh radio module; a command UI module; and one or more display units; the drop pods comprise: a drop pod control module; a pod mesh radio module; and a pod sensor array module, wherein the pod sensor array module comprises one or more sensor types and wherein a pod type of the drop pod corresponds to the sensor types; and the aircraft comprises: flight control module; a master mesh radio module; an aircraft sensor array module; and a drop pod bay unit, wherein the one or more drop pods are attached to the aircraft through the drop pod bay unit; and wherein the aircraft is configured to: receive, by the master mesh radio module over the mesh network, mission plan from the GCS, wherein the mission plan comprises one or more commands; control, by the flight control module, the aircraft based on the one or more commands; collect, by the aircraft sensor array module, environment data; identify, based on the environment data and the pod type of the one or more drop pods, one or more points of interest (POI), wherein the identifying further comprises determining a POI type for each of the POIs; select, for each POI, a POI drop pod from the one or more drop pods, wherein the selecting is based on the pod type and the POI; deploy, by the drop pod bay unit, each of the selected POI drop pods, wherein the deploying comprises: selecting a drop location and drop orientation based on the POI type; and releasing the selected POI drop pod at the selected drop location. The system of claim 1, wherein one or more of the one or more POIs is a gas type POI, and the identification is based in part on an altitude of the aircraft and a mesh network signal strength.

Example 2. The system of Example 1, wherein one or more of the one or more POIs is a gas type POI, and the identification is based in part on an altitude of the aircraft and a mesh network signal strength.

Example 3. The system of any one of Examples 1-2, wherein one or more of the one or more POIs is a camera type POI, and the identification is based in part on a count corresponding to a number of doors and stairways encountered by the aircraft.

Example 4. The system of any one of Examples 1-3, wherein one or more of the one or more POIs is a mesh node type POI, and the identification is based in part on a mesh network signal strength being below a predetermined threshold value.

Example 5. The system of any one of Examples 1-4, wherein the pod sensor array module comprises: one or more RGB camera modules; one or more thermal camera modules; one or more microphone modules; one or more CO sensor modules; one or more O2 sensor modules; one or more PM2.5 sensor modules; one or more temperature sensor modules; one or more motion sensor modules; or one or more ultrasound transducer modules; and wherein the aircraft sensor array module comprises: one or more RGB camera modules; one or more thermal camera modules; one or more microphone modules; one or more CO sensor modules; one or more O2 sensor modules; one or more PM2.5 sensor modules; one or more temperature sensor modules; one or more motion sensor modules; or one or more ultrasound transducer modules.

Example 6. The system of any one of Examples 1-5, wherein the GCS is configured to: generate, by the GCS control module, a mission plan, wherein the mission plan comprises one or more flight paths and one or more mission objectives, and wherein the one or more flight paths comprise a plurality of waypoints; transmit, over the slave mesh radio module, the mission plan to the aircraft; receive, over the slave mesh radio module, aircraft status from the aircraft and pod status from each of the deployed POI drop pods; generate, by the command UI module, a graphical user interface based on the received aircraft status and the received pod status of each of the deployed POI drop pods, wherein the received aircraft status and the received pod status of each of the deployed POI drop pods comprise one or more sensor readings; and display, by the one or more display units, the graphical user interface.

Example 7. The system of any one of Examples 1-6, wherein the GCS is further configured to: receive, by the command UI module, control input from a user, wherein the control input corresponds to modification to the mission plan; generate, by the GCS control module, a modified mission plan based on the received control input; and transmit, by the slave mesh radio module, the modified mission plan to the aircraft.

Example 8. The system of any one of Examples 1-7, wherein the aircraft further comprises a computer vision module and wherein the aircraft is further configured to: capture, by the aircraft sensor array module, image data of the environment; analyze, by the computer vision module, the captured image data, wherein the computer vision module comprises one or more trained machine learning models; autonomously modify the flight plan based on the analysis of the computer vision module, wherein the modification of the flight plan comprises: adding or removing waypoints to the flight path; and adding or removing mission objectives; and wherein identifying the one or more POIs is further based at least in part on the analysis of the computer vision module and the modification of the flight plan.

Example 9. A mesh sensor deployment method, the mesh sensor deployment method comprising: generating a mesh network comprising a ground control station (GCS), an aircraft and one or more drop pods, wherein the GCS comprises: a GCS control module; a slave mesh radio module; a command UI module; and one or more display units; wherein the drop pods comprise: a drop pod control module; a pod mesh radio module; and a pod sensor array module, wherein the pod sensor array module comprises one or more sensor types and wherein a pod type of the drop pod corresponds to the sensor types; and wherein the aircraft comprises: a flight control module; a master mesh radio module; an aircraft sensor array module; and a drop pod bay unit, wherein the one or more drop pods are attached to the aircraft through the drop pod bay unit; and wherein the aircraft is configured to: receive, by the master mesh radio module over the mesh network, mission plan from the GCS, wherein the mission plan comprises one or more commands; control, by the flight control module, the aircraft based on the one or more commands; collect, by the aircraft sensor array module, environment data; identify, based on the environment data and the pod type of the one or more drop pods, one or more points of interest (POI), wherein the identifying further comprises determining a POI type for each of the POIs; select, for each POI, a POI drop pod from the one or more drop pods, wherein the selecting is based on the pod type and the POI; deploy, by the drop pod bay unit, each of the selected POI drop pods, wherein the deploying comprises: selecting a drop location and drop orientation based on the POI type; and releasing the selected POI drop pod at the selected drop location.

Example 10. The method of Example 9, wherein one or more of the one or more POIs is a gas type POI, and the identification is based in part on an altitude of the aircraft and a mesh network signal strength.

Example 11. The method of any one of Examples 9-10, wherein one or more of the one or more POIs is a camera type POI, and the identification is based in part on a count corresponding to a number of doors and stairways encountered by the aircraft.

Example 12. The method of any one of Examples 9-11, wherein one or more of the one or more POIs is a mesh node type POI, and the identification is based in part on a mesh network signal strength being below a predetermined threshold value.

Example 13. The method of any one of Examples 9-12, wherein the pod sensor array module comprises: one or more RGB camera modules; one or more thermal camera modules; one or more microphone modules; one or more CO sensor modules; one or more O2 sensor modules; one or more PM2.5 sensor modules; one or more temperature sensor modules; one or more motion sensor modules; or one or more ultrasound transducer modules; and wherein the aircraft sensor array module comprises: one or more RGB camera modules; one or more thermal camera modules; one or more microphone modules; one or more CO sensor modules; one or more O2 sensor modules; one or more PM2.5 sensor modules; one or more temperature sensor modules; one or more motion sensor modules; or one or more ultrasound transducer modules.

Example 14. The method of any one of Examples 9-13, wherein the GCS is configured to: generate, by the GCS control module, a mission plan, wherein the mission plan comprises one or more flight paths and one or more mission objectives, and wherein the one or more flight paths comprise a plurality of waypoints; transmit, over the slave mesh radio module, the mission plan to the aircraft; receive, over the slave mesh radio module, aircraft status from the aircraft and pod status from each of the deployed POI drop pods; generate, by the command UI module, a graphical user interface based on the received aircraft status and the received pod status of each of the deployed POI drop pods, wherein the received aircraft status and the received pod status of each of the deployed POI drop pods comprise one or more sensor readings; and display, by the one or more display units, the graphical user interface.

Example 15. The method of any one of Examples 9-14, wherein the GCS is further configured to: receive, by the command UI module, control input from a user, wherein the control input corresponds to modification to the mission plan; generate, by the GCS control module, a modified mission plan based on the received control input; and transmit, by the slave mesh radio module, the modified mission plan to the aircraft.

Example 16. The method of any one of Examples 9-15, wherein the aircraft further comprises a computer vision module and wherein the aircraft is further configured to: capture, by the aircraft sensor array module, image data of the environment; analyze, by the computer vision module, the captured image data, wherein the computer vision module comprises one or more trained machine learning models; autonomously modify the flight plan based on the analysis of the computer vision module, wherein the modification of the flight plan comprises: adding or removing waypoints to the flight path; and adding or removing mission objectives; and wherein identifying the one or more POIs is further based at least in part on the analysis of the computer vision module and the modification of the flight plan.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A mesh sensor deployment system, the mesh sensor deployment system comprising:
a mesh network comprising a ground control station (GCS), an aircraft and one or more drop pods, and wherein the GCS comprises:
GCS control module;
a slave mesh radio module;
a command UI module; and
one or more display units;
the drop pods comprise:
a drop pod control module;
a pod mesh radio module; and
a pod sensor array module, wherein the pod sensor array module comprises one or more sensor types and wherein a pod type of the drop pod corresponds to the sensor types; and
the aircraft comprises:
flight control module;
a master mesh radio module;
an aircraft sensor array module; and
a drop pod bay unit, wherein the one or more drop pods are attached to the aircraft through the drop pod bay unit; and
wherein the aircraft is configured to:
receive, by the master mesh radio module over the mesh network, a mission plan from the GCS, wherein the mission plan comprises one or more commands;
control, by the flight control module, the aircraft based on the one or more commands;
collect, by the aircraft sensor array module, environment data;
identify, based on the environment data and the pod type of the one or more drop pods, one or more points of interest (POI), wherein the identifying further comprises determining a POI type for each of the POIs;
select, for each POI, a POI drop pod from the one or more drop pods, wherein the selecting is based on the pod type and the POI;
deploy, by the drop pod bay unit, each of the selected POI drop pods, wherein the deploying comprises:
selecting a drop location and drop orientation based on the POI type; and
releasing the selected POI drop pod at the selected drop location.

2. The system of claim 1, wherein one or more of the one or more POIs is a gas type POI, and the identification is based in part on an altitude of the aircraft and a mesh network signal strength.

3. The system of claim 1, wherein one or more of the one or more POIs is a camera type POI, and the identification is based in part on a count corresponding to a number of doors and stairways encountered by the aircraft.

4. The system of claim 1, wherein one or more of the one or more POIs is a mesh node type POI, and the identification is based in part on a mesh network signal strength being below a predetermined threshold value.

5. The system of claim 1, wherein the pod sensor array module comprises:
one or more RGB camera modules;
one or more thermal camera modules;
one or more microphone modules;
one or more CO sensor modules;
one or more O2 sensor modules;
one or more PM2.5 sensor modules;
one or more temperature sensor modules;
one or more motion sensor modules; or
one or more ultrasound transducer modules; and
wherein the aircraft sensor array module comprises:
one or more RGB camera modules;
one or more thermal camera modules;
one or more microphone modules;
one or more CO sensor modules;
one or more O2 sensor modules;
one or more PM2.5 sensor modules;
one or more temperature sensor modules;
one or more motion sensor modules; or
one or more ultrasound transducer modules.

6. The system of claim 1, wherein the GCS is configured to:
generate, by the GCS control module, a mission plan, wherein the mission plan comprises one or more flight paths and one or more mission objectives, and wherein the one or more flight paths comprise a plurality of waypoints;
transmit, over the slave mesh radio module, the mission plan to the aircraft;
receive, over the slave mesh radio module, aircraft status from the aircraft and pod status from each of the deployed POI drop pods;
generate, by the command UI module, a graphical user interface based on the received aircraft status and the received pod status of each of the deployed POI drop pods, wherein the received aircraft status and the received pod status of each of the deployed POI drop pods comprise one or more sensor readings; and
display, by the one or more display units, the graphical user interface.

7. The system of claim 6, wherein the GCS is further configured to:
receive, by the command UI module, control input from a user, wherein the control input corresponds to modification to the mission plan;
generate, by the GCS control module, a modified mission plan based on the received control input; and
transmit, by the slave mesh radio module, the modified mission plan to the aircraft.

8. The system of claim 7, wherein the aircraft further comprises a computer vision module and wherein the aircraft is further configured to:
capture, by the aircraft sensor array module, image data of the environment;

analyze, by the computer vision module, the captured image data, wherein the computer vision module comprises one or more trained machine learning models;
autonomously modify the flight plan based on the analysis of the computer vision module, wherein the modification of the flight plan comprises:
adding or removing waypoints to the flight path; and
adding or removing mission objectives; and
and wherein identifying the one or more POIs is further based at least in part on the analysis of the computer vision module and the modification of the flight plan.

9. A mesh sensor deployment method, the mesh sensor deployment method comprising:
generating a mesh network comprising a ground control station (GCS), an aircraft and one or more drop pods, wherein the GCS comprises;
a GCS control module;
a slave mesh radio module;
a command UI module; and
one or more display units;
wherein the drop pods comprise:
a drop pod control module;
a pod mesh radio module; and
a pod sensor array module, wherein the pod sensor array module comprises one or more sensor types and wherein a pod type of the drop pod corresponds to the sensor types; and
wherein the aircraft comprises:
a flight control module;
a master mesh radio module;
an aircraft sensor array module; and
a drop pod bay unit, wherein the one or more drop pods are attached to the aircraft through the drop pod bay unit; and
wherein the aircraft is configured to:
receive, by the master mesh radio module over the mesh network, a mission plan from the GCS, wherein the mission plan comprises one or more commands;
control, by the flight control module, the aircraft based on the one or more commands;
collect, by the aircraft sensor array module, environment data;
identify, based on the environment data and the pod type of the one or more drop pods, one or more points of interest (POI), wherein the identifying further comprises determining a POI type for each of the POIs;
select, for each POI, a POI drop pod from the one or more drop pods, wherein the selecting is based on the pod type and the POI;
deploy, by the drop pod bay unit, each of the selected POI drop pods, wherein the deploying comprises:
selecting a drop location and drop orientation based on the POI type; and
releasing the selected POI drop pod at the selected drop location.

10. The method of claim 9, wherein one or more of the one or more POIs is a gas type POI, and the identification is based in part on an altitude of the aircraft and a mesh network signal strength.

11. The method of claim 9, wherein one or more of the one or more POIs is a camera type POI, and the identification is based in part on a count corresponding to a number of doors and stairways encountered by the aircraft.

12. The method of claim 9, wherein one or more of the one or more POIs is a mesh node type POI, and the identification is based in part on a mesh network signal strength being below a predetermined threshold value.

13. The method of claim 9, wherein the pod sensor array module comprises:
one or more RGB camera modules;
one or more thermal camera modules;
one or more microphone modules;
one or more CO sensor modules;
one or more O2 sensor modules;
one or more PM2.5 sensor modules;
one or more temperature sensor modules;
one or more motion sensor modules; or
one or more ultrasound transducer modules; and
wherein the aircraft sensor array module comprises:
one or more RGB camera modules;
one or more thermal camera modules;
one or more microphone modules;
one or more CO sensor modules;
one or more O2 sensor modules;
one or more PM2.5 sensor modules;
one or more temperature sensor modules;
one or more motion sensor modules; or
one or more ultrasound transducer modules.

14. The method of claim 9, wherein the GCS is configured to:
generate, by the GCS control module, a mission plan, wherein the mission plan comprises one or more flight paths and one or more mission objectives, and wherein the one or more flight paths comprise a plurality of waypoints;
transmit, over the slave mesh radio module, the mission plan to the aircraft;
receive, over the slave mesh radio module, aircraft status from the aircraft and pod status from each of the deployed POI drop pods;
generate, by the command UI module, a graphical user interface based on the received aircraft status and the received pod status of each of the deployed POI drop pods, wherein the received aircraft status and the received pod status of each of the deployed POI drop pods comprise one or more sensor readings; and
display, by the one or more display units, the graphical user interface.

15. The method of claim 14, wherein the GCS is further configured to:
receive, by the command UI module, control input from a user, wherein the control input corresponds to modification to the mission plan;
generate, by the GCS control module, a modified mission plan based on the received control input; and
transmit, by the slave mesh radio module, the modified mission plan to the aircraft.

16. The method of claim 15, wherein the aircraft further comprises a computer vision module and wherein the aircraft is further configured to:
capture, by the aircraft sensor array module, image data of the environment;
analyze, by the computer vision module, the captured image data, wherein the computer vision module comprises one or more trained machine learning models;
autonomously modify the flight plan based on the analysis of the computer vision module, wherein the modification of the flight plan comprises:
adding or removing waypoints to the flight path; and
adding or removing mission objectives; and and wherein identifying the one or more POIs is further based at least in part on the analysis of the computer vision module and the modification of the flight plan.

\* \* \* \* \*